United States Patent
Pass et al.

(10) Patent No.: US 12,553,897 B2
(45) Date of Patent: Feb. 17, 2026

(54) USE OF CIRCULATING INTERLEUKIN-18 FOR PROGNOSTICATING AND TREATING RECURRENCE IN EARLY STAGE NON-SMALL CELL LUNG CANCER

(71) Applicant: New York University, New York, NY (US)

(72) Inventors: Harvey I. Pass, Bronxville, NY (US); Chandra M. Goparaju, Cliffside, NJ (US)

(73) Assignee: New York University, New York, NY (US)

( * ) Notice: Subject to any disclaimer, the term of this patent is extended or adjusted under 35 U.S.C. 154(b) by 759 days.

(21) Appl. No.: 17/808,379

(22) Filed: Jun. 23, 2022

(65) Prior Publication Data

US 2022/0412978 A1    Dec. 29, 2022

Related U.S. Application Data

(60) Provisional application No. 63/214,586, filed on Jun. 24, 2021.

(51) Int. Cl.
   *G01N 33/574*    (2006.01)
   *A61K 33/243*    (2019.01)

(52) U.S. Cl.
   CPC . *G01N 33/57423* (2013.01); *G01N 33/57484* (2013.01); *A61K 33/243* (2019.01); *G01N 2333/54* (2013.01)

(58) Field of Classification Search
   CPC ............................................. G01N 33/57423
   See application file for complete search history.

(56) References Cited

PUBLICATIONS

W Naumnik, E Chyczewska, Kovalchuk, O., J Tałałaj, T Izycki, & Panek, B. (2004). Serum levels of interleukin-18 (IL-18) and soluble interleukin-2 receptor (sIL-2R) in lung cancer. PubMed, 49, 246-251. (Year: 2004).*
Vansteenkiste, J. F., & Stroobants, S. S. (2006). PET scan in lung cancer: Current recommendations and innovation. Journal of Thoracic Oncology, 1(1), 71-73. https://doi.org/10.1097/01243894-200601000-00014 (Year: 2006).*
Tangkijvanich, P. et al. (2007). Role of serum interleukin-18 as a prognostic factor in patients with hepatocellular carcinoma. World Journal of Gastroenterology, 13(32), 4345-4349. https://doi.org/10.3748/wjg.v13.i32.4345 (Year: 2007).*
Bigbee, W. L. et al. (2012). A multiplexed serum biomarker immunoassay panel discriminates clinical lung cancer patients from high-risk individuals found to be cancer-free by CT screening. Journal of Thoracic Oncology, 7(4), 698-708. https://doi.org/10.1097/jto.0b013e31824ab6b0 (Year: 2012).*
Zappa, C., & Mousa, S. A. (2016). Non-small cell lung cancer: current treatment and future advances. Translational Lung Cancer Research, 5(3), 288-300. https://doi.org/10.21037/tlcr.2016.06.07 (Year: 2016).*
Jia et al., 2016, OncoTargets and Therapy, 9:1715-1719 (Year: 2016).*
Nakamura, K., et al., Dysregulated IL-18 Is a Key Driver of Immunosuppression and a Possible Therapeutic Target in the Multiple Myeloma Microenvironment, Cancer Cell, Apr. 9, 2018, vol. 33, pp. 634-648.
Cero, F.T., et al., IL-18 and IL-12 synergy induces matrix degrading enzymes in the lung, Aug. 21, 2012, Experimental Lung Research, vol. 38, No. 8, pp. 406-419.
Rovina, N., et al., VEGF and IL-18 in induced sputum of lung cancer patients, Cytokine, Mar. 12, 2011, vol. 54, pp. 277-281.
Farjadfar, A., et al., Interleukin-18 promoter polymorphism is associated with lung cancer: A case-control study, Acta Oncologica, Oct. 8, 2009, vol. 48, No. 7, pp. 971-976.
Zhong, L., et al., Identification of Secreted Proteins that Mediate Cell-Cell Interactions in an In vitro Model of the Lung Cancer Microenvironment, Cancer Research, Sep. 1, 2008, vol. 68, No. 17, pp. 7237-7245.
Chyczewska, N.W., et al., Serum levels of interleukin-18 (IL-18) and soluble interleukin-2 Receptor (sIL-2R) in lung cancer, Roczniki Akademii Medycznej w Bialymstoku, 2004, vol. 49, pp. 246-251.
Jiang, D.F., et al., Function of IL-18 in promoting metastasis of lung cancer, Zhonghua Zhong Liu Za Zhi, Jul. 2003, vol. 25, No. 4, pp. 348-352.
Lissoni, P., et al., Serum concentrations of interleukin-18 in early and advanced cancer patients: enhanced secretion in metastatic disease, Journal of Biological Regulators and Homeostatic Agents, Oct. 2000, vol. 14, No. 4, pp. 275-257.

* cited by examiner

*Primary Examiner* — Joanne Hama
(74) *Attorney, Agent, or Firm* — Hodgson Russ LLP (57) ABSTRACT

Provided are methods for aiding in diagnosis and treatment of non-small cell lung cancer (NSCLC) adenocarcinoma. The methods involve determining elevated circulating Interleukin-18 (IL-18) values to aid in the diagnosis and treatment of NSCLC. Medical interventions based on determining circulating IL-18 levels are provided and include additional scanning, surgical resection of tumors, and administration of adjuvant therapy, such as chemotherapy or immune therapy.

5 Claims, 12 Drawing Sheets

USE OF CIRCULATING INTERLEUKIN-18 FOR PROGNOSTICATING AND TREATING RECURRENCE IN EARLY STAGE NON-SMALL CELL LUNG CANCER

CROSS-REFERENCE TO RELATED APPLICATIONS

This application claims priority to the provisional patent application filed on Jun. 24, 2021, and assigned U.S. Application No. 63/214,586, the entire disclosure of which is hereby incorporated by reference.

STATEMENT REGARDING FEDERALLY SPONSORED RESEARCH

This invention was made with government support under grant number CA214195 awarded by the National Institutes of Health. The government has certain rights in the invention.

BACKGROUND OF THE INVENTION

Early stage non-small cell lung cancer (NSCLC) has a recurrence rate of ~30% with a median post-recurrence survival time of ~2 years. Molecular mechanisms underlying these recurrences are unknown. Recently, the study of different histologic subtypes for lung adenocarcinomas revealed the possibility for improved prognostication. The International Association for the Study of Lung Cancer (IASLC) classification of lung adenocarcinomas can stratify the prognosis of early stage lung cancers on the basis of histologic cell type, and the presence of solid and micropapillary components predict a shorter progression free survival. However, this criteria is not a reliable predictor since it has been observed that while a portion of patients with solid and/or micropapillary components have the predicted increased recurrence events according to the grading system, others with solid and/or micropapillary components may not recur even five years after R0 resection. The use of adjuvant therapy for all of these patients would result in overtreatment and unnecessary intervention in patients destined not to recur. The current prognostic models based solely on the classification and other demographic predictors including lymphovascular invasion, pleural invasion, or size fail to stratify for recurrence with the necessary sensitivity and specificity. Other attempts at differentiating adenocarcinomas into various subtypes have not heretofore been able to provide prognostic information that is reliable and sensitive.

SUMMARY OF THE DISCLOSURE

The present disclosure provides methods for prognostication and treatment of recurrence in early stage non-small cell lung cancer (NSCLC), particularly, adenocarcinoma. The methods disclosed herein are based on the surprising observation that elevated plasma Interleukin-18 (IL-18) levels were correlated with high sensitivity and specificity with increased likelihood of recurrence after complete resection of primary lung lesions.

In an embodiment, the present disclosure provides a method for aiding in the diagnosis of NSCLC comprising determining IL-18 levels in individuals who are suspected of NSCLC. If elevated IL-18 levels are identified, the individual is identified as being likely to have recurrence of resected primary lung lesions.

In an embodiment, the present disclosure provides a method for aiding in the diagnosis of NSCLC comprising determining IL-18 levels in individuals who are suspected of NSCLC, but who have a negative CT scan. If elevated IL-18 levels are identified, the individual is subjected to further tests or scans, such as a PET scan, or targeted for more frequent follow up or monitoring.

In an embodiment, the present disclosure provide a method for identifying if an individual who has been diagnosed with NSCLC, and who has undergone primary lesion resection is likely to have recurrence comprising determining circulating IL-18 levels. If elevated IL-18 levels compared to a threshold or reference value are identified, the individual is identified as likely to have recurrence and therefore, as needing adjuvant therapy and/or extensive monitoring. In an embodiment, the individual is further administered adjuvant therapy following complete resection even in the absence of any indication of progress of disease to secondary locations. Adjuvant therapy may comprise chemotherapy, immunotherapy, radiation, or any other interventional modality, or blockage of IL-18 production or action, or combinations thereof.

In an embodiment, the present disclosure provides a method for treating a subject for NSCLC comprising i) identifying a human subject as having a positive CT scan showing one or more lesions, and elevated levels of IL-18 relative to a threshold or reference value, ii) resecting the lesion or lesions, and administering adjuvant therapy to the individual. The adjuvant therapy may be chemotherapy, immunotherapy, radiation, or any other interventional modality, or an agent that interferes with the production or actions of IL-18, or combinations thereof.

DESCRIPTION OF THE DISCLOSURE

This disclosure describes methods for prognosticating recurrence of lung cancer, and improving the prognosis of lung cancer patients having likelihood of recurrence. The methods are based, at least in part, on the presently disclosed finding that plasma IL-18 is correlated with increased likelihood of recurrence of NSCLC.

The term "treatment" as used herein refers to reduction or delay in one or more symptoms or features associated with the presence of the particular condition being treated. Treatment does not mean complete cure and does not preclude relapse.

The term "therapeutically effective" dose or amount as used herein is the amount sufficient to achieve, in a single or multiple doses, the intended purpose of treatment. For example, an effective amount to treat or prevent recurrence of NSCLC adenocarcinoma is the amount sufficient to reduce the likelihood of recurrence, or reduce the severity or size of the recurrence such as secondary lesions. The exact amount desired or required will vary depending on the mode of administration, patient specifics and the like. Appropriate effective amounts can be determined by one of ordinary skill in the art (such as a clinician) with the benefit of the present disclosure.

Where a range of values is provided in this disclosure, it should be understood that each intervening value, to the tenth of the unit of the lower limit between the upper and lower limit of that range, and any other intervening value in that stated range is encompassed within the invention, unless clearly indicated otherwise. The upper and lower limits of these smaller ranges may independently be included in the smaller ranges encompassed within the disclosure.

As used in this disclosure, the singular forms include the plural forms and vice versa unless the context clearly indicates otherwise.

This disclosure describes that the marker identified herein, IL-18, exhibits sensitivity and specificity such that it can provide reliable and accurate information for a clinician to change the workup of a patient and monitor malignancy. IL-18 may be useful as a specific target for novel therapeutic strategies.

IL-18 (Interleukin-18) is secreted by macrophages, dendritic cells, and epithelial cells. Circulating mature IL-18 is sequestered by soluble IL-18 binding proteins (IL-18 BP) that inhibit IL-18 bioactivity. IL-18 is considered to signal through a receptor complex that contains IL-18 R alpha IL-18 R beta. It works with other cytokines to activate NK, Th1, and Th17 cells and to increase the production of IFN-gamma. It can also promote Th2 cytokine release which may reduce the effectiveness of antiviral responses. Increased levels of active IL-18 contribute to the severity of autoimmunity and hypertension, while deficiency of IL-18 results in symptoms of metabolic syndrome. IL-1β and IL-18 are central modulators of tumorigenic processes that may either promote or suppress tumor growth depending on the tumor type, stage and microenvironment. IL-18 is sequestered and neutralized in circulation by soluble IL-18 binding protein (IL-18BP) IL-18 is constitutively expressed by most cell types including myeloid cells, fibroblasts and epithelial cells, and readily detected in the bloodstream.

The recognition, based on the present disclosure, that IL-18 levels are correlated with more aggressive forms of lung cancer allows manipulation of treatment, planning, monitoring, and therapy of patients with early stage lung cancer. While IL-18 by itself alone, is not considered a marker for diagnosis of early stage lung cancer, as data reveals no differences between IL-18 levels in patients with documented malignant nodules compared to IL-18 levels in patients with benign nodules resected at surgery, plasma (i.e., circulating) IL-18 levels can be used as part of the staging workup to diagnose early stage lung cancer. An individual who is suspected of, or being examined for, lung cancer may have an initial Computed Tomography (CT) scan. If the CT scan is clear, circulating IL-18 levels may be determined. Alternatively, IL-18 levels may be determined in parallel with CT scan testing. If circulating IL-18 levels are high relative to a reference or threshold value, then this would be an indication for the individual to have further tests, despite a clear CT scan. Further tests may comprise a PET or other scans.

NSCLC adenocarcinoma can be clinically staged. Clinical staging can be performed by any method known to one of skill in the art. For example, for a lung cancer, the cancer can be staged using TNM staging, which is based on the size and extent of the main tumor, the spread to nearby lymph nodes and the spread (metastasis) to distant sites. The present method is particularly useful for Stage I adenocarcinoma because the method is able to discriminate between progressors and non-progressors within this stage group.

In an embodiment, the present disclosure provides a method for aiding in the diagnosis of lung cancer comprising determining circulating IL-18 levels in an individual who is being investigated for having lung cancer and/or who is exhibiting a clean CT scan (i.e., from the CT scan a diagnosis of lung cancer is not made). If the level of circulating IL-18 is higher than a threshold or reference value, the disclosure further comprises subjecting the individual to one or more tests, such as a positron emission tomography (PET) scan, even if the individual is considered to have a clear CT.

In an embodiment, the present method provides a method of optimizing treatment of an individual diagnosed with NSCLC following a CT scan (or other equivalent scans) comprising determining circulating IL-18 levels in the individual, and if the circulating IL-18 level is higher than a threshold or reference value, then subjecting the individual to surgical intervention (such as complete resection of the primary lesion) and administering adjuvant therapy to the individual, but if the circulating IL-18 level is not higher than a threshold or reference value, then subjecting the individual to surgical intervention only, without adjuvant therapy.

In an embodiment, the present method provides a method for treating a subject for NSCLC comprising i) identifying a human subject as having a positive CT scan showing one or more lesions, and elevated levels of IL-18 relative to a threshold or reference value, ii) resecting the lesion or lesions, and administering an adjuvant therapy to the individual.

The adjuvant therapy may be an chemotherapeutic agent, an immunological agent or an agent that interferes with the production or actions of IL-18, or combinations thereof. Examples of chemotherapeutic agents useful for NSCLC adenocarcinoma include cisplatin, carboplatin, Paclitaxel (Taxol), Abraxane (albumin bound paclitaxel), Docetaxel (Taxotere), Gemcitabine, Vinorelbine, Etoposide, Pemetrexed and others, and combinations thereof. Examples of immunotherapy agents include Immune checkpoint inhibitors, such as PD-1/PD-L1 inhibitors. Examples of immune checkpoint inhibitors include agents or antibodies that target PD-1, PD-L1, CTLA-4, LAG3, B7-H3, B7-H4, or TIM3. Examples include nivolumab, pembrolizumab, durvalumab, BMS-936559, MPDL3280A, ipilimumab, tremelimumab and the like. Antibodies or fragments thereof or derivatives thereof directed to IL-18 production or action may also be used. Examples of IL-18 neutralizing agents include humanized monoclonal antibody GSK1070806, for which studies have demonstrated its safety, tolerability, pharmacokinetics, and pharmacodynamics profile, in the treatment of type 2 diabetes mellitus. Further, recombinant human IL-18BP is another IL-18-neutralizing biologic for which phase I, II and III clinical studies are ongoing for other indications. In other embodiments, IL-18 receptor antagonist or agents blocking IL-18Rα/IL-18β complex may be used. In embodiments, any combination of the suitable chemotherapeutic agent, immunotherapy agent and anti-IL-18 agent may be used.

Specific dosage and treatment regimen for any particular patient will depend upon a variety of factors, including the activity of the specific chemical entity employed, the age, body weight, general health, sex, diet, time of administration, rate of excretion, drug combination, and the severity of the particular disease being treated. The determination of effective dosage levels, that is the dose levels necessary to achieve the desired result, is within the purview of one skilled in the art, such as a clinician, using routine methods. Typically, dosages can be between about 1 ng/kg and about 100 mg/kg of body weight/day, and all ranges and values therebetween. For example, the dosage can be from about 10 ng/kg and about 10 mg/kg, or from about 100 ng/kg and about 1 mg/kg or from 100 ng/kg to 100 micrograms/kg, or from 1 microgram to 1 milligram/kg of body weight per day or per any other suitable period.

IL-18 levels may be evaluated in any biological fluid, such as circulating fluids, such as blood, plasma, serum of any fraction of the blood, plasma or serum. In an embodiment, IL-18 levels may be evaluated in buffy coat. Buffy coat comprises platelets, granulocytes, monocytes and peripheral blood mononuclear cells. Buffy coat, which is generally whitish in color, can be obtained following centrifugation of blood and appears as a layer separating the clear fluid (plasma) and a red fluid containing red blood cells.

The control or reference values as used herein may be determined from a population of individuals who are normal, e.g., who do not have NSCLC. A cut-off threshold value may be used as a reference value as described herein. This disclosure describes how to identify suitable cut-off values. For example, an Area Under the Curve (AUC) Receiving Operating Characteristics (ROC) curve may be used. A suitable cut-off value may be selected to provide a desired sensitivity and specificity. For example, a suitable cut-off value may provide a sensitivity of at least 80% and a specificity of at least 95%. In embodiments, the sensitivity may be from 80% to 100%, and specificity from 90% to 100%. In embodiments, the cut-off value may provide a sensitivity of 85, 86, 87, 88, 89, 90, 91, 92, 93, 94, 95, 96, 97, 98 or 99%, and a specificity of 95, 96, 97, 98 or 99%. In an embodiment, a cut-off value is selected which provides a sensitivity of at least 84% and a specificity of at least 95%. In an embodiment, a cut-off value of 33 ng/ml of IL-18 of plasma may be used. In an embodiment, a cut-off value of 33.75 ng/ml may be used. The cut-off values for IL-18 in this disclosure are indicated for plasma, unless otherwise indicated. The cutoff is associated with a Youden Index J and is known as the associated criterion if the progression percentage is 50% which is an overestimate. In the literature, the progression prevalence in patients with stage I disease is 25%. If this is assumed in the ROC calculations, then the optimum criteria is >42.5 ng/ml, with a resulting sensitivity of 76% and specificity of 98%.

The sensitivity of a test (also called the true positive rate) is defined as the proportion of people with the disease who will have a positive result. In other words, a highly sensitive test is one that correctly identifies patients with a disease.

The specificity of a test (also called the True Negative Rate) is the proportion of people without the disease who will have a negative result. In other words, the specificity of a test refers to how well a test identifies patients who do not have a disease.

IL-18 levels may be determined by any known method in the art, including by immunological methods, such as ELISA assays and the like. Commercial kits are available for measurement of plasma IL-18.

Circulating IL-18 levels may be used as a diagnostic tool not only in the initial evaluation, but also in the subsequent workup on the patient. For example, patients presenting with a solitary pulmonary nodule in a high risk (such as because of tobacco consumption) must have a diagnostic workup for lung cancer. This, in the vast majority of cases, include not only a diagnostic CT of the lung, but also a PET-CT. This will give a first order indication of the fluorodeoxyglucose (FDG) utilization of the nodule, as well as whether there are other abnormal areas of FDG uptake. The patient may have a percutaneous biopsy of the nodule which reveals an adenocarcinoma of the lung. Depending on the National Cancer Centers Network (NCCN) guidelines regarding location and size of the nodule, further invasive staging may be indicated in order to pathologically assess the status of the mediastinal lymph nodes. These staging procedures including mediastinoscopy, endobronchial ultrasound with needle aspiration of suspicious, enlarged nodes or of those with FDA update, or other video assisted techniques for node evaluation and biopsy. If the biopsy of the lymph nodes reveals no evidence of cancer, and an IL-18 level is low, i.e. below the cut-off point associated with the possibility of future recurrence, then the patient should proceed with R0 resection of the cancer with lymph node dissection. If the biopsy reveals cancer in the lymph nodes, one would expect, based on the present disclosure, that the IL-18 level is elevated since the levels in Stage II lung cancer are equal to those in Stage I patients who eventually recur in lymph node basins. If the biopsy does not reveal cancer in the lymph nodes, and the IL level is elevated, there remains the possibility that the invasive and radiographic/nuclear staging was not sensitive enough to detect whether "progression" (i.e. recurrence that would manifest later if the patient has R0 resection with elevated IL-18) has already occurred. In this instance, either extended indications for radiographic staging, i.e. brain MRI, or more sensitive imaging staging adjuncts may be pursued.

Elevated IL-18 levels may be used as in indication that an individual should be subjected to extensive monitoring. Currently, there are no set guidelines for the monitoring of patients having R0 resection of an early lung adenocarcinoma. R0 resection means a microscopically margin-negative resection, in which no gross or microscopic tumor remains in the primary tumor bed. Current options include either or both the use of both CT scanning and chest radiograph, and the frequency of imaging and clinical examination, which can vary from 3 months to one year. For a patient who is found to have an IL-18 level that is elevated preoperatively but no other evidence for another site of disease is found, these patients may need closer surveillance if a recurrence is to be detected at the earliest post resection interval. Thus, an advantage of the present method is that monitoring due to IL-18 overexpression would (1) lead to earlier pathologic proof of disease recurrence and (2) timely institution of appropriate, efficacious adjuvant therapy would improve overall survival.

In an embodiment, this disclosure provides a method for determining if an individual being treated for lung cancer is in need of adjuvant therapy. For example, following resection of early lung adenocarcinoma, if IL-18 levels are found to be higher than a threshold or compared to a reference value, the individual may be started in an adjuvant therapy regimen. For example, neoadjuvant therapies, such as chemotherapy (e.g., cisplatin), targeted therapies (based on NGS or PD-L1 of the pre-resection percutaneous biopsy), or novel therapies targeted to IL-18 may be used, such as targeted to IL-18 neutralization with IL-18 binding proteins.

The present methods can be used for determining likelihood of recurrence of lung cancer in any mammal, including domestic and farm animals. In an embodiment, the mammal is a human. The terms "individual" or "subject" may be used interchangeably in this disclosure.

The methods provided herein are considered to be particularly suitable for prognosis, management and treatment of non-small cell lung adenocarcinoma, and particularly Stage I adenocarcinoma. The disclosed methods can be used to determine the prognosis of the subject, which includes the likelihood (probability) of recurrence of cancer after resection of lung adenocarcinoma or survival of the subject, an indication of metastasis, as well as to alert the physician of the possibility of radiographically and asymptomatic metastases. In particular examples, the method can determine with a reasonable amount of sensitivity and specificity whether a subject is likely to have recurrence within 36 months.

The present method can also be used to aid in treating an individual diagnosed with non-small cell lung carcinoma. The method comprises subjecting an individual who has been diagnosed with NSC lung adenocarcinoma to a surgical procedure to remove the primary lesion (such as complete resection of the tumor), determining circulating IL-18 levels in the individual, if the circulating IL-18 levels are higher than a threshold or higher than a reference, then beginning adjuvant therapy to the individual, and optionally subjecting the individual to extensive monitoring to screen for recurrences, and if the circulating IL-18 levels are not higher than a threshold or are the same or lower than a reference value, then not beginning adjuvant therapy, but optionally continuing monitoring.

The level of IL-18 can be used to determine if there is a poor prognosis for the subject after surgical resection of the primary lesion such that there is a greater than a certain percentage (such as 94%) likelihood that the subject will have recurrence, which may be in the form of locoregional (3) systemic (4) a second primary lung cancer, or metastasis.

The following examples are provided as illustrative examples and are not intended to be restrictive in any way.

EXAMPLE 1

Figure 1:
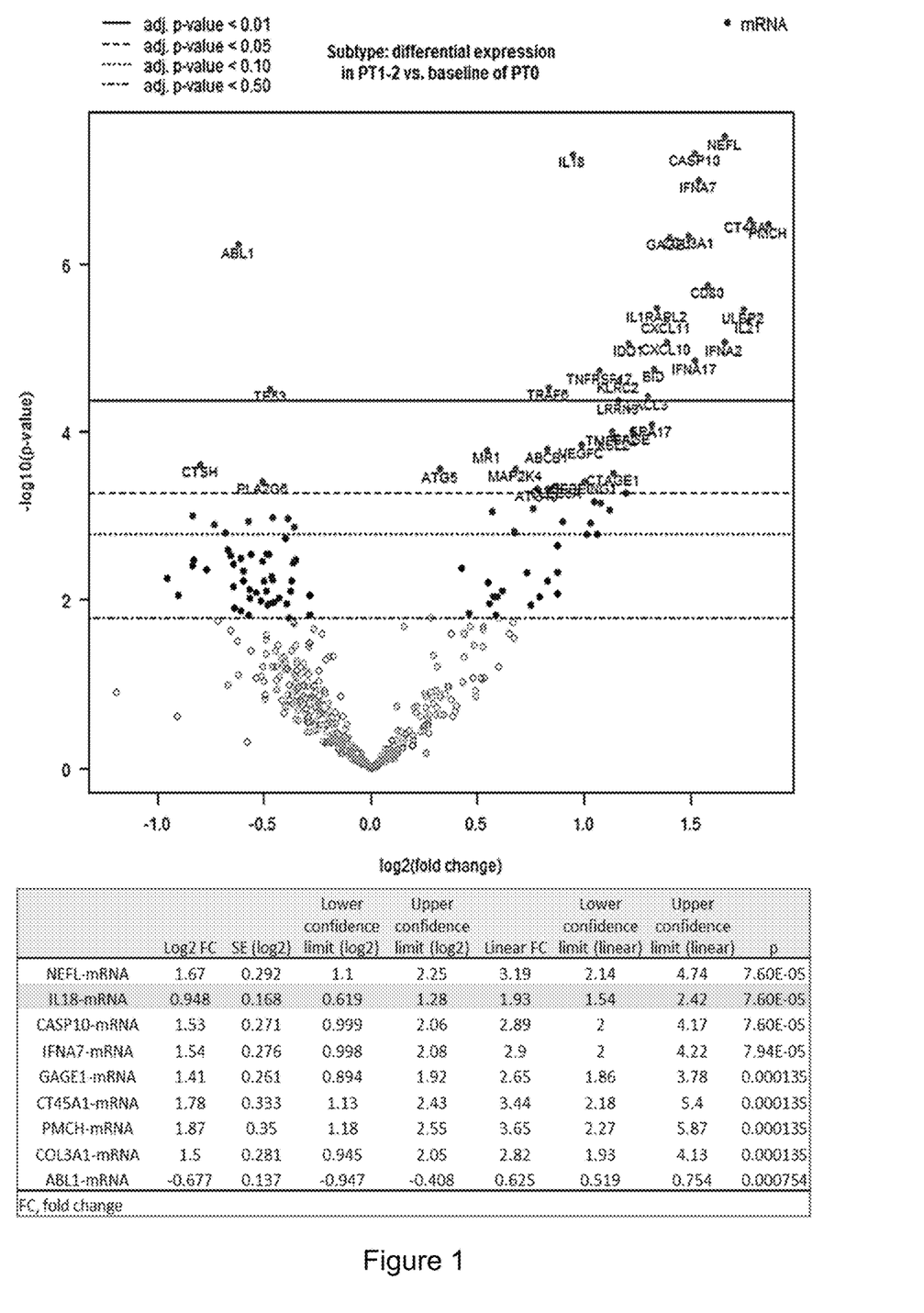
FIG. 1. Volcano plot of differential genes in BC from early lung cancer patients. IL-18 is among the top 10 most differentially expressed between patients who recur and those who did not.
Figure 2:
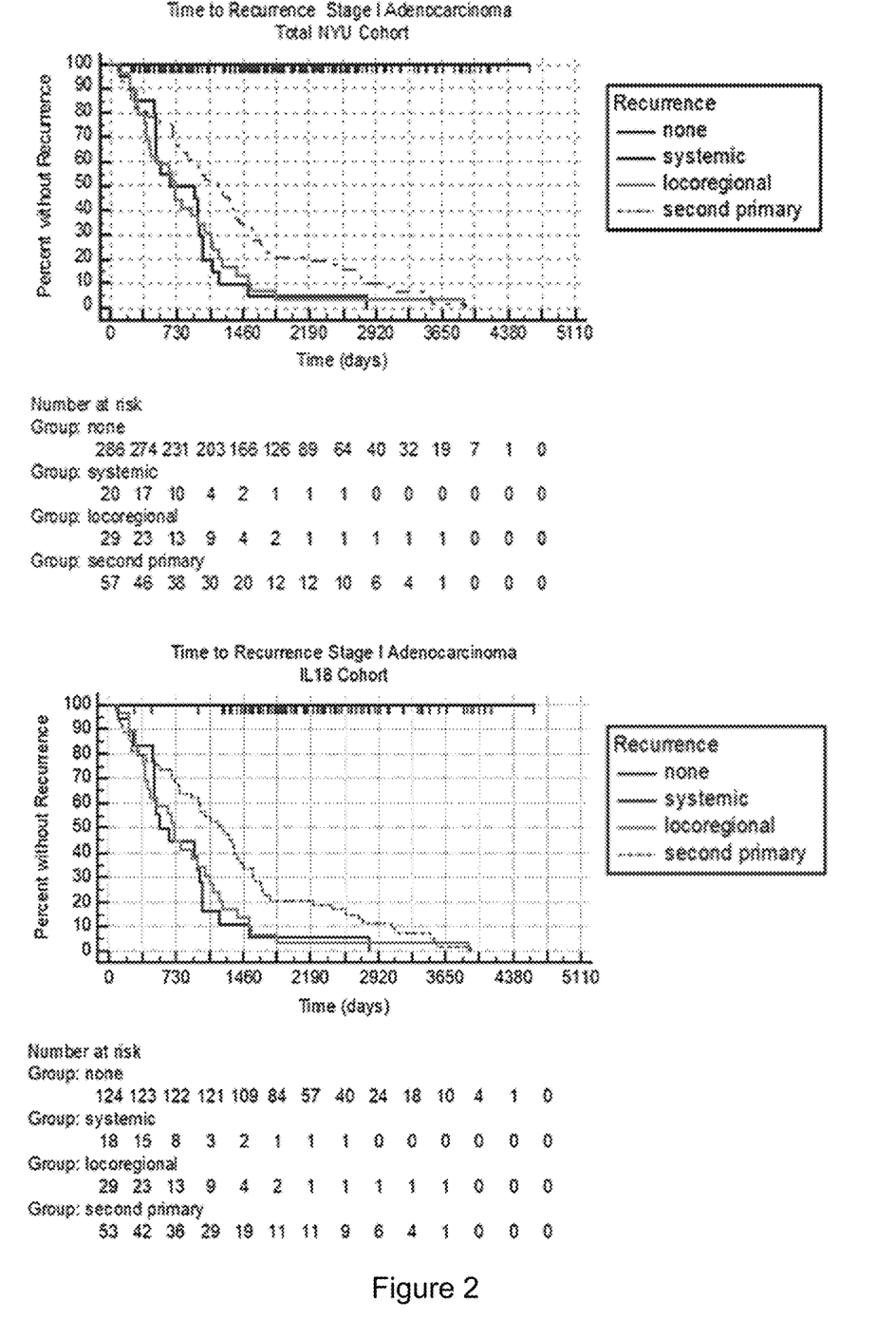
FIG. 2. The subcohort of Stage I Adenocarcinomas with IL-18 levels had the same recurrence dynamics as the total NYU Stage I Adenocarcinoma archives.

In a cohort of early stage adenocarcinoma patients from the Thoracic Surgery Archives, having complete resection between 2006 and 2015, RNA was extracted from snap frozen buffy coats, harvested at the time of resection or prior to resection using EDTA B&D tubes. We subsequently investigated for 770 immunogenes using the nCounter® PanCancer Immune Profiling Panel. After QC and normalization, there were 148 patients without recurrence (NR) and 31 with recurrence. Recurrences were defined as either systemic metastatic disease and/or locoregional (lymph node or tumor bed). The Volcano plot revealing differentially expressed immunogenes between NR and R is seen in FIG. 1, along with the log 2 and linear fold change between NR and R for the top 10 immunogenes. Technical validation of the Nanostring results was performed for 3 NRs and 3 Rs using quantitative PCR of three of the differentially expressed genes and is seen in Table 1. A commercially available ELISA from R&D (Human IL-18/IL-1F4 ELISA, catalog number D180) was then used to validate the transcriptomic buffy coat data prognostic power in preoperative plasma IL-18. The cohort that was available for these studies included 392 early stage adenocarcinoma patients having complete pathologic examination after R0 resection at NYU Langone Medical Center. Of these 224 had plasma IL-18 measured using the ELISA. As seen in FIG. 2, the subcohort that had IL-18 measurement was representative of the entire cohort with regard to whether the patient (1) did not progress or progressed with (2) locoregional (3) systemic (4) a second primary lung cancer. The IL-18 cohort was specifically chosen to include as many of the patients with documented recurrence as possible who had plasma available.

TABLE 1

Validation of nanostring expression by quantitative PCR reveals significantly higher levels of IL-18 in BC of patients who recur.

qRT-PCR Validation of Differentially Expressed Genes

| R | IL18-mRNA | CASP10-mRNA | GAGE1-mRNA | KLRC2-mRNA |
|---|---|---|---|---|
| NYU1201 | 667.7005702 | 764.3786376 | 54.27540622 | 456.256335 |
| NYU413 | 658.2711907 | 784.1474999 | 394.137296 | 460.1707697 |
| NYU1097 | 573.3365339 | 617.6014868 | 503.777322 | 600.738476 |
| NR | IL18-mRNA | CASP10-mRNA | GAGE1-mRNA | KLRC2-mRNA |
| NYU661 | 45.90002752 | 66.61101555 | 19.59147516 | 39.18295032 |
| NYU1559 | 47.74305517 | 35.1316821 | 84.67636199 | 164.8486622 |
| NYU915 | 48.08279002 | 36.57000931 | 14.89889268 | 78.89640898 |

TABLE 2

Correlation coefficient (r) with clinical and pathological variables.
Correlation Coefficient (r) With Clinical And Pathologic Variables

| | r value | P value | CI 95% Confidence interval for r |
|---|---|---|---|
| Age | 0.01648 | P = 0.8046 | −0.1137 to 0.1461 |
| Size | 0.1606 | P = 0.0161 | 0.03016 to 0.2857 |
| Presence of Lymphovascular Invasion | 0.08491 | P = 0.1723 | −0.03713 to 0.2045 |

TABLE 2-continued

Correlation coefficient (r) with clinical and pathological variables.
Correlation Coefficient (r) With Clinical And Pathologic Variables

|  | r value | P value | CI 95% Confidence interval for r |
|---|---|---|---|
| Presence of Pleural Invasion | 0.1410 | P = 0.0469 | 0.001994 to 0.2747 |
| Pack years | 0.1097 | P = 0.1007 | −0.02139 to 0.2371 |
| % lepidic | −0.005634 | P = 0.9393 | −0.1498 to 0.1388 |
| % acinar | 0.04337 | P = 0.5556 | −0.1008 to 0.1857 |
| % papillar | −0.02533 | P = 0.7343 | −0.1702 to 0.1206 |
| % micropapillary | 0.1050 | P = 0.1583 | −0.04106 to 0.2467 |
| % solid | 0.1141 | P = 0.1261 | −0.03227 to 0.2557 |
| % cribiform | 0.004091 | P = 0.9565 | −0.1423 to 0.1503 |
| % fused glands | 0.2602 | P = 0.0004 | 0.1185 to 0.3916 |

Figure 3:
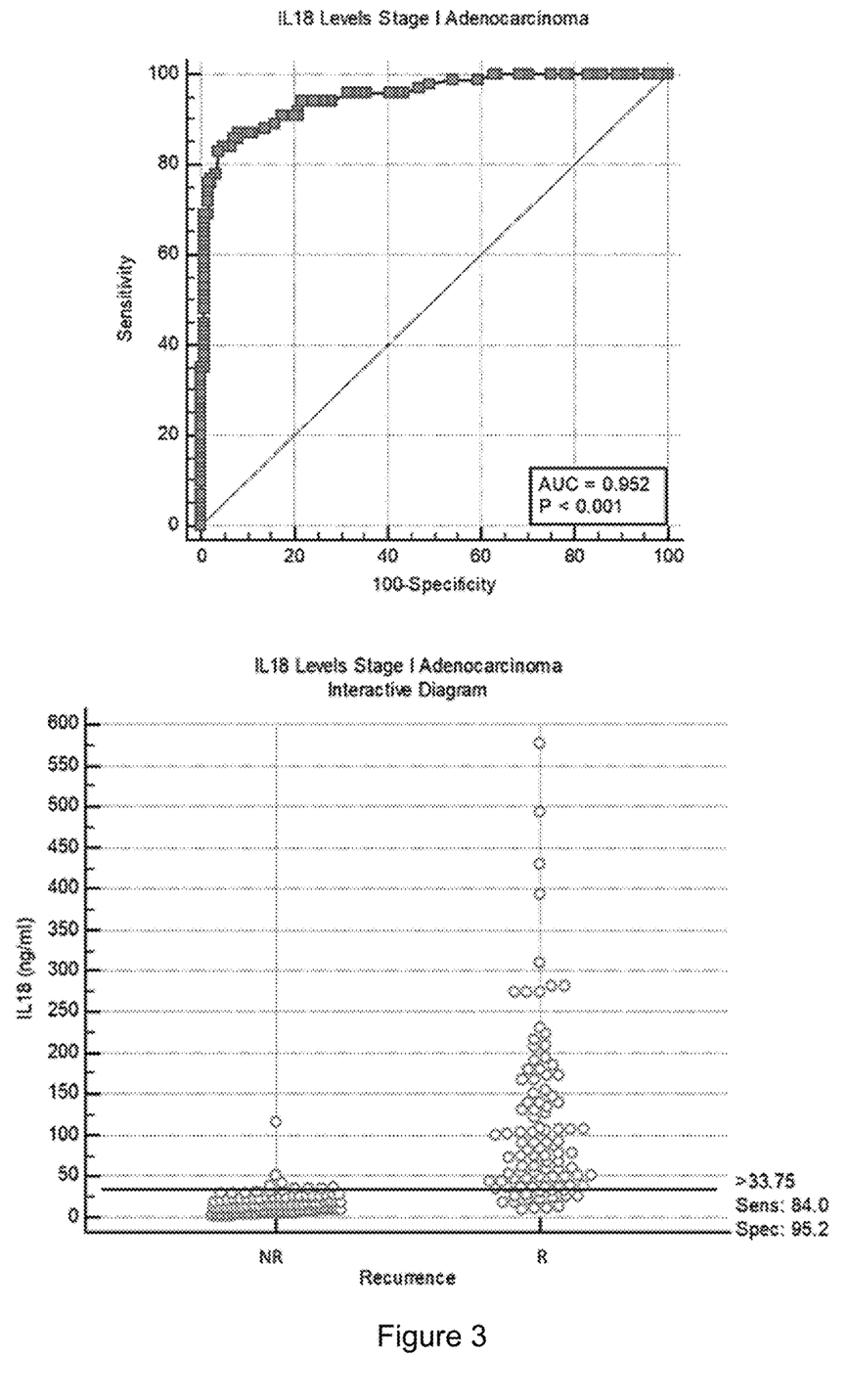
FIG. 3. ROC and interactive diagram for 224 Stage I adenocarcinomas illustrating IL-18 levels. See text for details.
Figure 4:
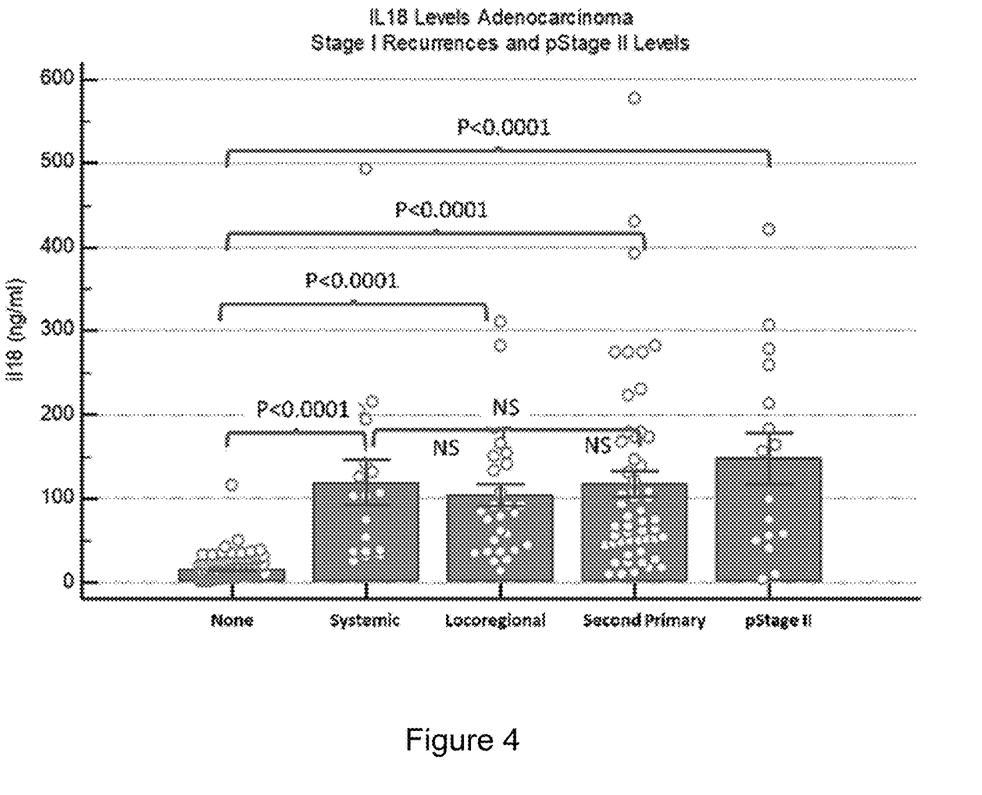
FIG. 4. IL-18 level were significantly elevated at the time of resection in patients who recurred and were not significantly different from pre-resection levels from patients with pathologically proven Stage II disease.
Figure 5:
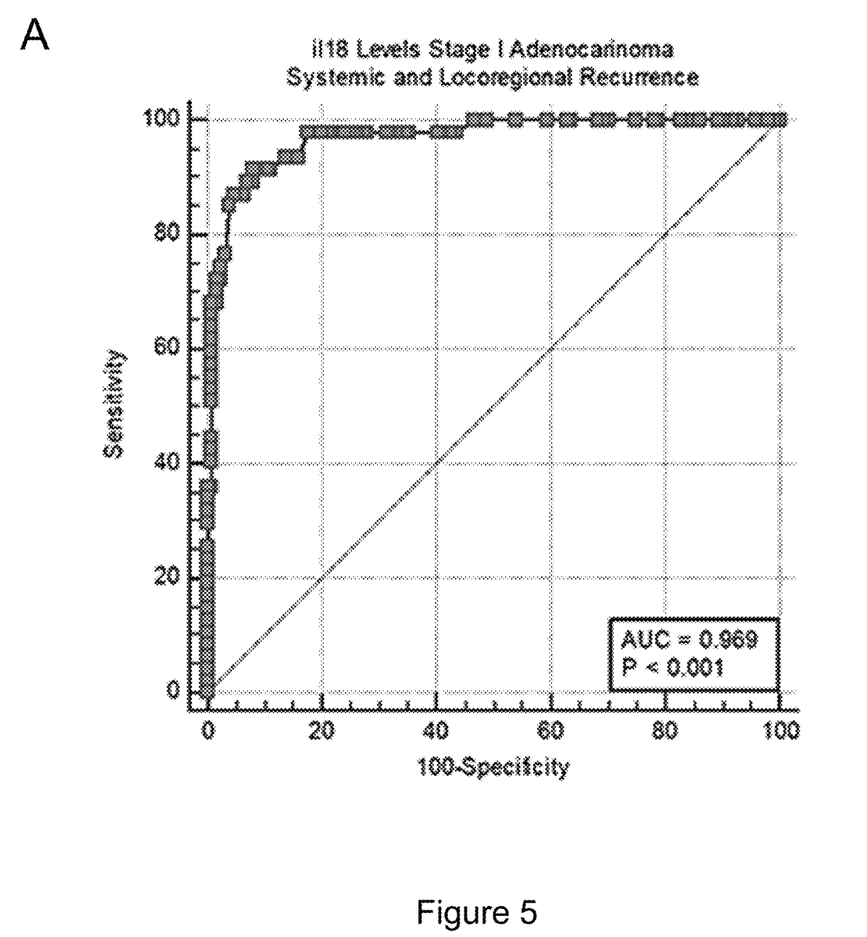
FIG. 5. A different IL-18 plasma level cut-point defines locoregional/systemic recurrences (A) compared to that for second primary (D). Panels B-C and E-F reveal the true time to recurrence curves for these progression types compared to those constructed using the aforementioned IL-18 plasma cutpoints.
Figure 5E:
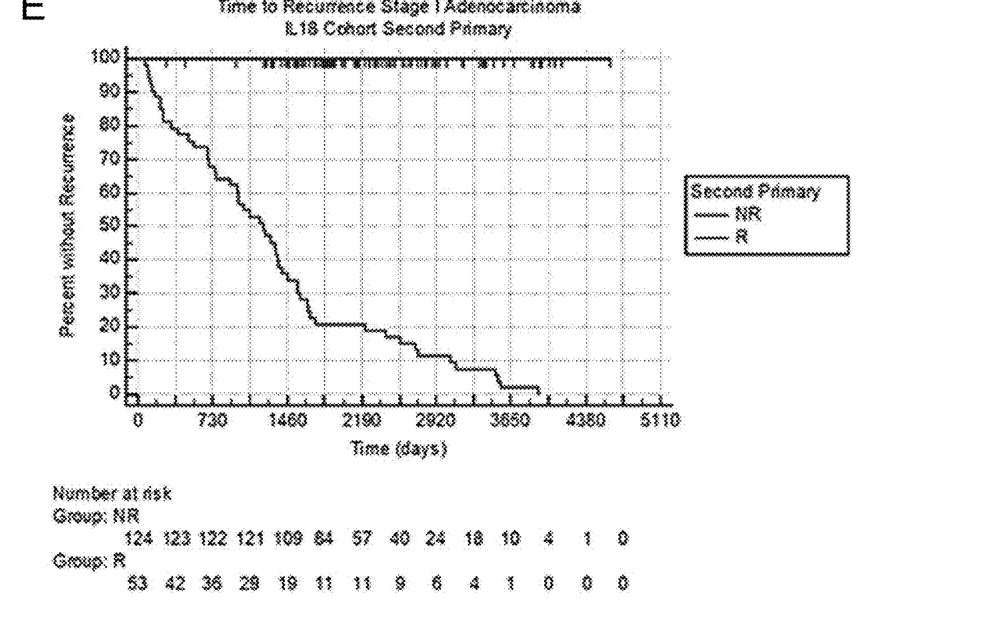
Figure 5F:
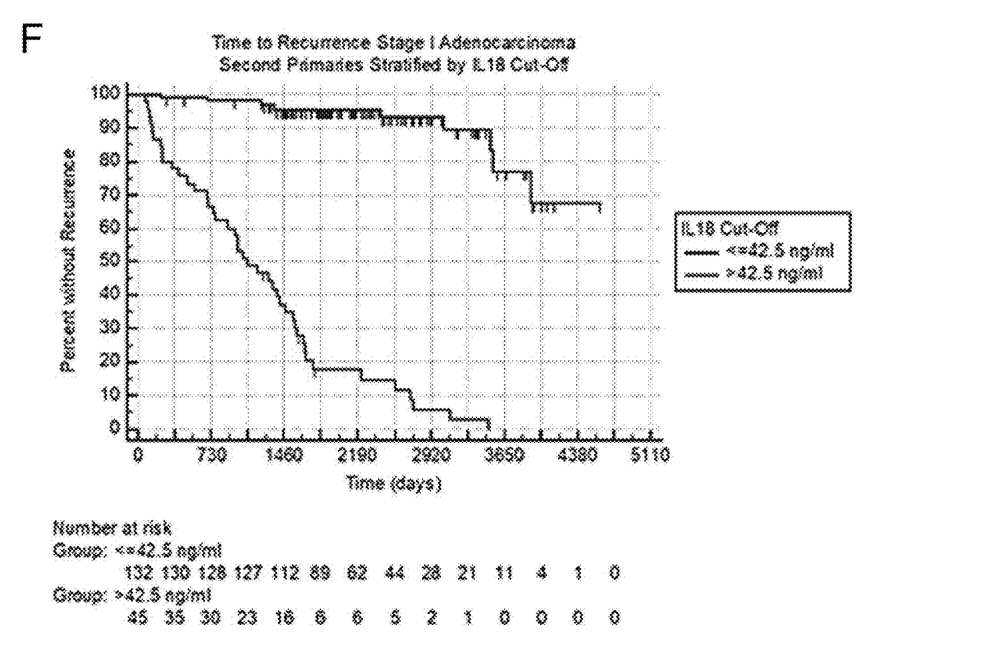

Elevated Pre-Resection IL-18 Levels in Stage I Lung Adenocarcinoma are associated with Recurrence. ROC curves generated for prognostication of recurrence reveal an area under the curve (AUC) of 0.952 (p<0.0001, CI 0.915-0.976) for all 224 patients in separating NR from R resulting in a sensitivity of 84% and specificity of 95% at an optimal cutpoint of 33.75 ng/ml (FIG. 3). The IL-18 levels of patients in each of the recurrence categories were significantly elevated over the preresection IL-18 levels for those patients who did not recur. There were no differences in the median levels of IL-18 preoperative plasmas that were prognostic for either systemic, locoregional, or the development of a second primary recurrence (FIG. 4). Moreover, there were no significant difference in the plasma levels of pStage I patients who recurred compared to pre-resection plasma from 33 pStage II. Nevertheless as seen in FIG. 5, AUCs and cutpoints for the second primary recurrences and the systemic/locoregional recurrences were not the same (0.937 and 0.969;42.5 ng/ml vs 30.0 ng/ml, respectively). When comparing the actual time to recurrence curves for systemic/locoregional recurrences and second primaries to those predicted by the cut-off points, more accurate prognostication seems to favor the systemic/locoregional cases (FIGS. 5B and 5E vs FIGS. 5C and 5F, respectively).

There was poor correlation with the majority of the usual prognostic clinicopathologic features for early stage adenocarcinoma of the lung, but it is of interest that the fused gland histologic pattern which has been associated with poor outcomes had a low but significant correlation with IL-18 plasma levels.

Figure 6:
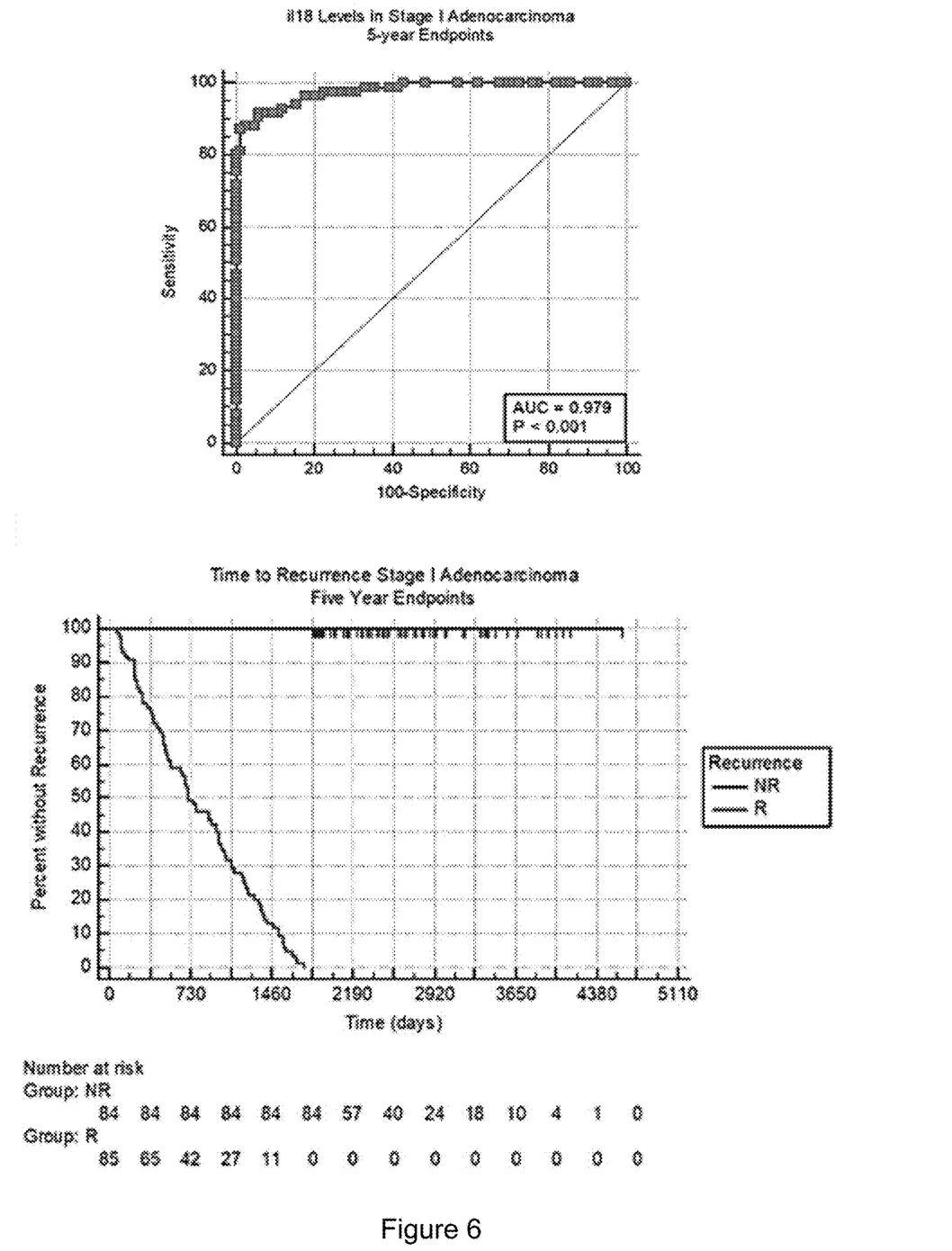
FIG. 6. Data derived from patients who either recurred less 5 years from resection or who were confirmed without recurrence at least 5 years from resection.

Analysis in Cohorts That Have Reached Five Year Follow-up Timepoints. As depicted in FIGS. 1 and 5, there are some non recurrent patients in the IL-18 cohort how have not reached five year milestones; hence, whether their IL-18 levels reflect recurrence or non recurrence is unknown. We investigated IL-18 levels in patients who recurred prior to 5 years compared to those without recurrence five years or greater (FIG. 6). AUC was a striking 0.979 (p<0.001, CI 0.944 to 0.995) with a sensitivity and specificity of 87% and 99%, respectively.

Figure 7:
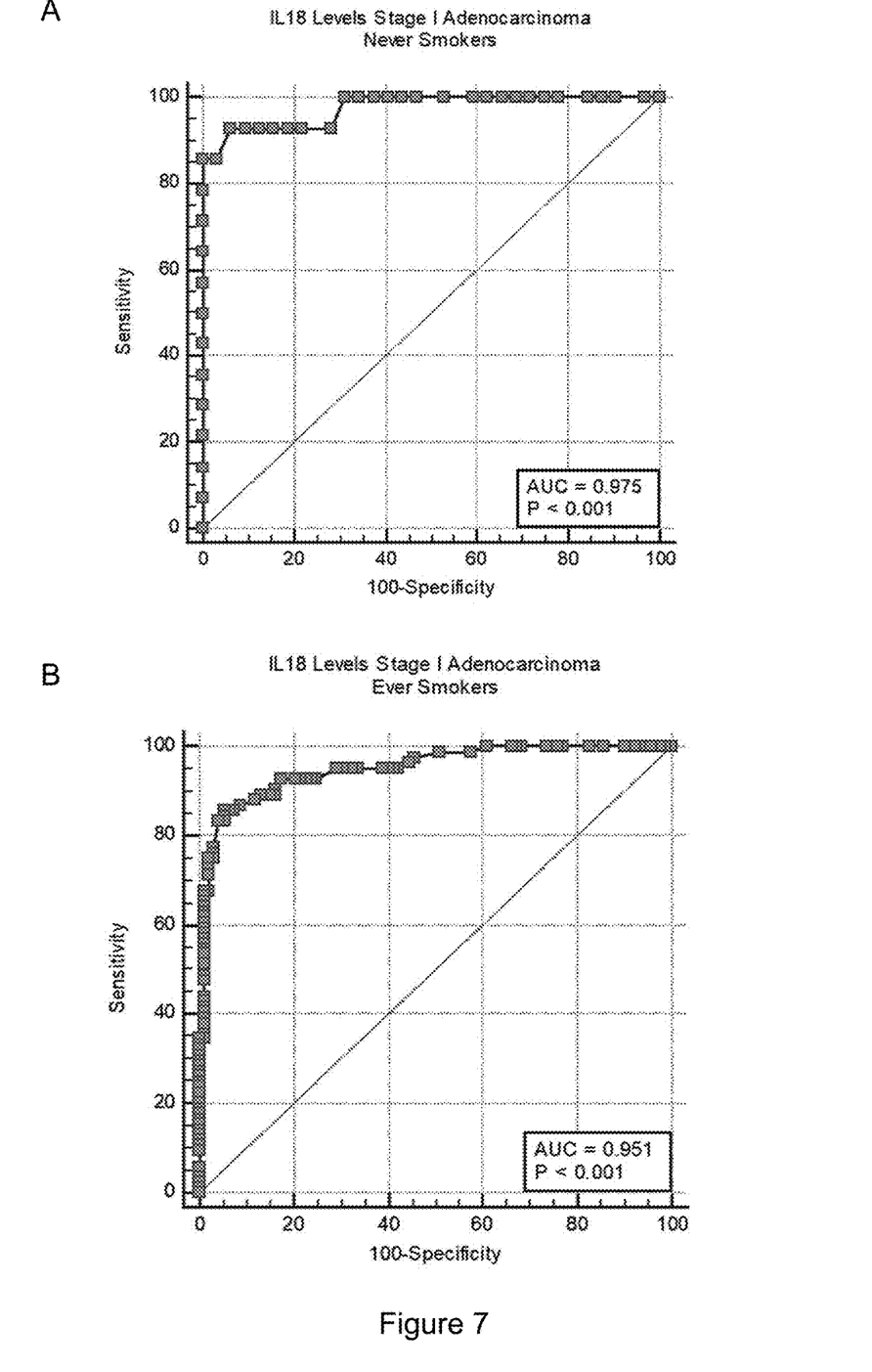
FIG. 7. The prognostic ability (A, B) of IL-18 plasma levels at the time of resection for Stage I lung cancer is independent of the tobacco consumption of the patient.

IL-18 Plasma Prognostication is independent of Tobacco Exposure. In order to investigate environmental inflammatory exposure by tobacco smoke as an influence on IL-18 prognostic potential, we constructed IL-18 recurrence ROC curves for both never smoker Stage I adenocarcinomas and ever smokers. As seen in FIG. 7A, there was no loss of sensitivity in 222/224 patients with known smoking status (never, 46; ever, 176) which implies that the IL-18 ability to prognosticate lung cancer is independent of smoking status.

Figure 8:
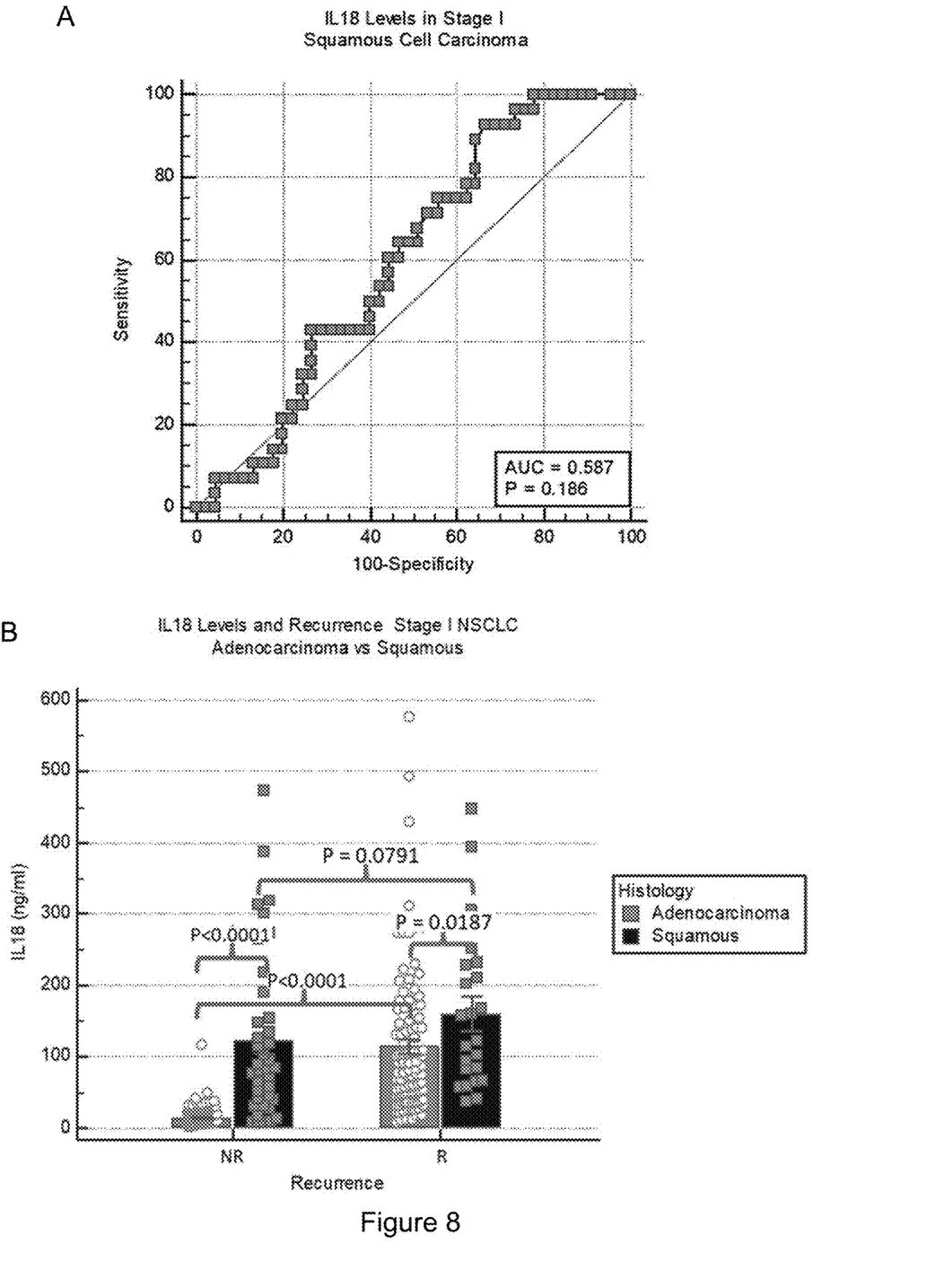
FIG. 8. ROC curve (A) reveals a lack of a definitive cutpoint for IL-18 plasma levels for prognostication of early stage squamous cell carcinoma. (B) Early stage squamous cell carcinoma has higher levels of blood IL-18 compared to adenocarcinoma.

Influence of NSCLC Histology on IL-18 Prognostication in Early Stages. In 73 Stage I Squamous Cell lung cancer patients, we found that IL-18 levels at the time of resection could not distinguish patients who will recur from those who will not (FIG. 8). The IL-18 levels, however, for squamous cell patients were significantly elevated over those from the adenocarcinoma patients.

While the present invention has been described through illustrative embodiments, routine modification will be apparent to those skilled in the art and such modifications are intended to be within the scope of this disclosure. Hence, the present disclosure is deemed limited only by the appended claims and the reasonable interpretation thereof.

What is claimed is:

1. A method of prognosticating a likelihood of recurrence of, and treating an individual diagnosed with non-small cell lung cancer (NSCLC) adenocarcinoma, said treatment following surgical resection of the NSCLC, the method comprising:
   a) determining a level of circulating Interleukin-18 (IL-18) from a preoperative biological sample obtained from the individual that is higher than a reference value of about 33 ng/ml of the IL-18 to predict a likelihood of recurrence of the NSCLC and
   b) administering adjuvant therapy to the individual as the treatment.

2. The method of claim 1, wherein the adjuvant therapy comprises chemotherapy or immunotherapy.

3. The method of claim 2, wherein the adjuvant therapy comprises administration of cisplatin.

4. The method of claim 2, wherein the reference value provides a sensitivity of at least 80% and a specificity of at least 90%.

5. The method of claim 4, wherein the reference value provides a sensitivity of at least 84% and a specificity of at least 95%.

* * * * *